(12) United States Patent
Shimoda et al.

(10) Patent No.: US 10,461,337 B2
(45) Date of Patent: Oct. 29, 2019

(54) OXIDE ALL-SOLID-STATE BATTERY

(71) Applicants: Tatsuya Shimoda, Nomi (JP); Takashi Masuda, Nonoichi (JP); Toshiya Saito, Nagaizumi-cho (JP); Shingo Ohta, Numazu (JP)

(72) Inventors: Tatsuya Shimoda, Nomi (JP); Takashi Masuda, Nonoichi (JP); Toshiya Saito, Nagaizumi-cho (JP); Shingo Ohta, Numazu (JP)

(73) Assignees: JAPAN ADVANCED INSTITUTE OF SCIENCE AND TECHNOLOGY, Nomi-shi, Ishikawa-ken (JP); TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/903,092

(22) Filed: Feb. 23, 2018

(65) Prior Publication Data

US 2018/0248201 A1 Aug. 30, 2018

(30) Foreign Application Priority Data

Feb. 27, 2017 (JP) .................................. 2017-035185

(51) Int. Cl.
*H01B 1/06* (2006.01)
*H01B 1/08* (2006.01)
(Continued)

(52) U.S. Cl.
CPC ......... *H01M 6/185* (2013.01); *H01M 4/0407* (2013.01); *H01M 4/0471* (2013.01);
(Continued)

(58) Field of Classification Search
None
See application file for complete search history.

(56) References Cited

U.S. PATENT DOCUMENTS

| 2012/0328915 A1 | 12/2012 | Hirose et al. |
| 2013/0084505 A1* | 4/2013 | Iriyama ................. C04B 35/486 |
| | | 429/319 |

FOREIGN PATENT DOCUMENTS

| JP | 2011-54457 A | 3/2011 |
| JP | 2011-070939 A | 4/2011 |

(Continued)

*Primary Examiner* — Ula C Ruddock
*Assistant Examiner* — Amanda Rosenbaum
(74) *Attorney, Agent, or Firm* — Sughrue Mion, PLLC

(57) ABSTRACT

An oxide all-solid-state battery excellent in lithium ion conductivity and joint strength between an anode active material layer and solid electrolyte layer thereof. In the oxide all-solid-state battery, the solid electrolyte layer is a layer mainly containing a garnet-type oxide solid electrolyte sintered body represented by the following formula (1): $(Li_{x-3y-z}, E_y, H_z)L_\alpha M_\beta O_\gamma$; a solid electrolyte interface layer is disposed between the anode active material layer and the solid electrolyte layer; the solid electrolyte interface layer contains at least a Si element and an O element; and a laminate containing at least the anode active material layer, the solid electrolyte interface layer and the solid electrolyte layer has peaks at positions where $2\theta=32.3°\pm0.5°$, $37.6°\pm0.5°$, $43.8°\pm0.5°$, and $57.7°\pm0.5°$ in a XRD spectrum obtained by XRD measurement using CuKα irradiation.

5 Claims, 7 Drawing Sheets

(51) Int. Cl.
    *H01M 4/38*          (2006.01)
    *H01M 4/134*        (2010.01)
    *H01M 10/052*       (2010.01)
    *H01M 10/0562*      (2010.01)
    *H01M 10/0585*      (2010.01)
    *H01M 6/18*         (2006.01)
    *H01M 4/04*         (2006.01)
    *H01M 4/1395*       (2010.01)
    *H01M 10/058*       (2010.01)

(52) U.S. Cl.
    CPC ......... *H01M 4/0497* (2013.01); *H01M 4/134* (2013.01); *H01M 4/1395* (2013.01); *H01M 4/386* (2013.01); *H01M 10/052* (2013.01); *H01M 10/058* (2013.01); *H01M 10/0562* (2013.01); *H01M 4/0426* (2013.01); *H01M 2300/0071* (2013.01); *H01M 2300/0094* (2013.01)

(56) References Cited

FOREIGN PATENT DOCUMENTS

| | | | |
|---|---|---|---|
| JP | 2012-18792 A | 1/2012 | |
| JP | 2013-008587 A | 1/2013 | |
| JP | 2013-187260 A | 9/2013 | |
| JP | 2016-040767 A | 3/2016 | |
| WO | 2017/190135 A1 | 11/2017 | |
| WO | WO-2017190135 A1 * | 11/2017 | .......... H01M 4/0423 |

\* cited by examiner

OXIDE ALL-SOLID-STATE BATTERY

TECHNICAL FIELD

The disclosure relates to an oxide all-solid-state battery excellent in lithium ion conductivity and joint strength between an anode active material layer and solid electrolyte layer thereof.

BACKGROUND

An all-solid-state battery is such a battery that the cathode, the anode and the electrolyte layer present between the electrodes are all solid. Among all-solid-state batteries, an oxide all-solid-state battery comprising an oxide solid electrolyte is advantageous in that it is easy to handle in the air compared to a sulfide all-solid-state battery that may produce hydrogen sulfide.

As an oxide solid electrolyte with excellent lithium ion conductivity, a Li—La—Zr—O-based solid electrolyte (i.e., a garnet-type oxide solid electrolyte) is known.

A carbon anode has been used as the anode of an all-solid-state battery. However, the theoretical capacity of the carbon anode is only 372 mAhg$^{-1}$. Therefore, to increase the anode capacity, various kinds of anode materials have been developed. Of them, a silicon anode has attracted attention since, when it is sufficiently lithiated (Li$_{22}$Si$_5$), the theoretical capacity is as high as 4200 mAhg$^{-1}$.

For example, a perovskite-type oxide solid electrolyte such as (Li, La)TiO$_3$ and a nasicon-type oxide solid electrolyte such as Li(Al, Ti)(PO$_4$)$_3$ are known as oxide solid electrolytes. They contain elements such as Ti and Ga. The reduction potentials of Ti and Ga are higher than the potential of the silicon anode. Therefore, in oxide all-solid-state batteries comprising such oxide solid electrolytes, the silicon anode cannot be used since the oxide solid electrolytes cause reductive decomposition.

Meanwhile, since the reduction potential of the garnet-type oxide solid electrolyte is lower than the potential of the silicon anode, the garnet-type oxide solid electrolyte can be used in an oxide all-solid-state battery in combination with the silicon anode.

Patent Literature 1 discloses a lithium battery comprising a solid electrolyte layer which comprises Li, La, Zr, Al, Si and O, which has a garnet-type structure, and which is a sintered body. Also in Patent Literature 1, there is a description of the use of Si as an anode active material.

Patent Literature 1: Japanese Patent Application Laid-Open No. 2012-018792

In Patent Literature 1, however, an experimental example of producing a battery by combining a garnet-type oxide solid electrolyte with an anode active material containing Si, is not disclosed. This is considered to be because the production or charge and discharge of the battery is difficult in the prior art due to the following reasons.

First, silicon particles are a very hard substance. Therefore, it is difficult to dispose such silicon particles and a solid electrolyte with securing a sufficient contact area therebetween.

Also, the garnet-type oxide solid electrolyte generally has a high sintering temperature of 1,200° C. Meanwhile, silicon itself has an oxidation temperature of about 700° C. When silicon is oxidized, it is converted into silicon oxide (SiO$_2$). A battery containing such SiO$_2$ cannot be charged and discharged. Therefore, when the garnet-type oxide solid electrolyte and silicon are tried to be joined by sintering them, SiO$_2$ is produced before they are joined. Therefore, a joined body thus obtained cannot be used as a battery material.

Due to the above reasons, there is no known example of producing an all-solid-state battery by combining the silicon anode and the garnet-type oxide solid electrolyte.

SUMMARY

The disclosed embodiments were achieved in light of the above circumstances of oxide all-solid-state batteries. An object of the disclosed embodiments is to provide an oxide all-solid-state battery excellent in lithium ion conductivity and joint strength between the anode active material layer and solid electrolyte layer thereof.

In a first embodiment, there is provided an oxide all-solid-state battery comprising a cathode active material layer, an anode active material layer mainly comprising silicon, and a solid electrolyte layer disposed between the cathode active material layer and the anode active material layer, wherein the solid electrolyte layer is a layer mainly comprising a garnet-type oxide solid electrolyte sintered body represented by the following formula (1):

$$(Li_{x-3y-z}E_yH_z)L_\alpha M_\beta O_\gamma \qquad \text{Formula (1)}$$

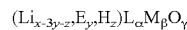

where E is at least one kind of element selected from the group consisting of Al and Ga; L is at least one kind of element selected from the group consisting of an alkaline-earth metal element and a lanthanoid element; M is at least one kind of element selected from a transition element that can be six-coordinated with oxygen and typical elements in the Groups 12 to 15; x, y and z are real numbers that satisfy $5 \le x - 3y - z \le 7$, $0 \le y < 0.22$ and $0 \le z < 2.0$, respectively; and $\alpha$, $\beta$ and $\gamma$ are real numbers that satisfy $2.5 \le \alpha \le 3.5$, $1.5 \le \beta \le 2.5$ and $11 \le \gamma \le 13$, respectively;

wherein a solid electrolyte interface layer is disposed between the anode active material layer and the solid electrolyte layer;

wherein the solid electrolyte interface layer comprises at least a Si element and an O element; and wherein a laminate comprising at least the anode active material layer, the solid electrolyte interface layer and the solid electrolyte layer has peaks at positions where $2\theta = 32.3° \pm 0.5°$, $37.6° \pm 0.5°$, $43.8° \pm 0.5°$, and $57.7° \pm 0.5°$ in a XRD spectrum obtained by XRD measurement using CuKα irradiation.

The solid electrolyte interface layer may comprise a Si element, an O element and a Li element.

The peaks at the positions where $2\theta = 32.3° \pm 0.5°$, $37.6° \pm 0.5°$, $43.8° \pm 0.5°$, and $57.7° \pm 0.5°$ in the XRD spectrum, may be assigned to the solid electrolyte interface layer.

An average thickness of the solid electrolyte interface layer may be 1 nm or more and 800 nm or less.

The anode active material layer may be an amorphous layer mainly comprising silicon.

In another embodiment, there is provided a method for producing the above-described oxide all-solid-state battery, the method comprising the steps of: attaching a liquid silicon material to at least a part of a surface of the garnet-type oxide solid electrolyte represented by the formula (1), and heating the garnet-type oxide solid electrolyte to which the liquid silicon material is attached, in an inert atmosphere and a temperature condition of 400° C. or more and 500° C. or less.

The oxide all-solid-state battery according to the disclosed embodiments comprises the specific solid electrolyte interface layer between the anode active material layer mainly comprising silicon and the solid electrolyte layer mainly comprising the garnet-type oxide solid electrolyte sintered body. Therefore, excellent lithium ion conductivity and joint strength can be obtained between the anode active material layer and the solid electrolyte layer. According to the production method of the disclosed embodiments, joining of the anode active material layer and the solid electrolyte layer, which has been impossible until now, can be achieved by using the liquid silicon material.

BRIEF DESCRIPTION OF THE DRAWINGS

In the accompanying drawings.

DETAILED DESCRIPTION

1. The Oxide All-solid-state Battery

The oxide all-solid-state battery according to the disclosed embodiments is an oxide all-solid-state battery comprising a cathode active material layer, an anode active material layer mainly comprising silicon, and a solid electrolyte layer disposed between the cathode active material layer and the anode active material layer, wherein the solid electrolyte layer is a layer mainly comprising a garnet-type oxide solid electrolyte sintered body represented by the following formula (1):

$$(Li_{x-3y-z}, E_y, H_z)L_\alpha M_\beta O_\gamma$$ Formula (1):

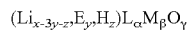

where E is at least one kind of element selected from the group consisting of Al and Ga; L is at least one kind of element selected from the group consisting of an alkaline-earth metal element and a lanthanoid element; M is at least one kind of element selected from a transition element that can be six-coordinated with oxygen and typical elements in the Groups 12 to 15; x, y and z are real numbers that satisfy $5 \leq x-3y-z \leq 7$, $0 \leq y < 0.22$ and $0 \leq z < 2.0$, respectively; and $\alpha$, $\beta$ and $\gamma$ are real numbers that satisfy $2.5 \leq \alpha \leq 3.5$, $1.5 \leq \beta \leq 2.5$ and $11 \leq \gamma \leq 13$, respectively;

wherein a solid electrolyte interface layer is disposed between the anode active material layer and the solid electrolyte layer;

wherein the solid electrolyte interface layer comprises at least a Si element and an O element; and wherein a laminate comprising at least the anode active material layer, the solid electrolyte interface layer and the solid electrolyte layer has peaks at positions where $2\theta = 32.3° \pm 0.5°$, $37.6° \pm 0.5°$, $43.8° \pm 0.5°$, and $57.7° \pm 0.5°$ in a XRD spectrum obtained by XRD measurement using CuKα irradiation.

Figure 1:
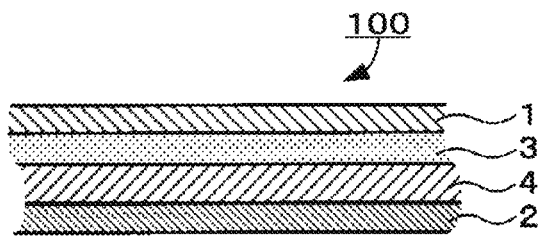
FIG. 1 is a view of an example of the layer structure of the oxide all-solid-state battery according to the disclosed embodiments, and it is also a schematic sectional view of the oxide all-solid-state battery cut in the laminating direction.

FIG. 1 is a view of an example of the layer structure of the oxide all-solid-state battery according to the disclosed embodiments, and it is also a schematic sectional view of the oxide all-solid-state battery cut in the laminating direction. The thicknesses of the layers of the disclosed embodiments are not limited to those shown in FIG. 1.

An oxide all-solid-state battery 100 comprises a cathode active material layer 1, an anode active material layer 2, and a solid electrolyte layer 3 disposed between the cathode active material layer 1 and the anode active material layer 2. In addition, the oxide all-solid-state battery comprises a solid electrolyte interface layer 4 between the anode active material layer 2 and the solid electrolyte layer 3.

The oxide all-solid-state battery according to the disclosed embodiments is not limited to this example. For example, a cathode current collector may be provided on a side of the cathode active material layer 1, which is opposite to the side facing the solid electrolyte layer 3. An anode current collector may be provided on a side of the anode active material layer 2, which is opposite to the side facing the solid electrolyte layer 3.

(1) The Anode Active Material Layer

The anode active material layer is not particularly limited, as long as it is a layer mainly comprising silicon. As used herein, "mainly comprising silicon" means that silicon represents the largest of all elements contained in the anode active material layer. More specifically, silicon atoms account for more than 50 atm % of all atoms contained in the anode active material layer.

As shown in "Examples" described below, in the disclosed embodiments, the anode active material layer, the solid electrolyte interface layer and the solid electrolyte layer are strongly joined; therefore, it is sometimes difficult to differentiate between the layers by a section thereof. Accordingly, for example, the layers can be differentiated by checking the element distribution of each layer by line analysis, which is an elemental analysis method, using energy dispersive X-ray spectroscopy (EDX) with a scanning electron microscope (SEM) (hereinafter it may be referred to as SEM-EDX) (see (b) shown in FIG. 5). It can be said that, as a result of this elemental analysis, a part where the Si element is relatively heavily detected, is the anode active material layer.

However, it cannot be said that the whole of the part where the Si element is present is the anode active material layer. For example, when it is difficult to differentiate between the anode active material layer and the anode current collector, the boundary between the anode active material layer and the anode current collector can be determined as the part where the Si element is present and where the element derived from the anode current collector (such as gold) accounts for the largest proportion. More specifically, a region where it is difficult to differentiate between the anode active material layer and the anode current collector, is divided by the boundary. Then, a region where the Si element is more than a certain level and accounts for a large proportion, can be determined as the anode active material layer, and a region where the element derived from the anode current collector is more than a certain level and accounts for a large proportion, can be determined as the anode current collector.

When it is difficult to differentiate between the anode active material layer and the solid electrolyte interface layer, the boundary between the two layers can be determined as a part where the Si element is present and where the element derived from the solid electrolyte interface layer (such as oxygen) accounts for the largest proportion. More specifically, a region where it is difficult to differentiate between the anode active material layer and the solid electrolyte interface layer, is divided by the boundary. Then, a region where the Si element is more than a certain level and accounts for a large proportion, is determined as the anode active material layer, and a region where the element derived from the solid electrolyte interface layer is more than a certain level and accounts for a large proportion, can be determined as the solid electrolyte interface layer.

Also, the anode active material layer can be an amorphous layer mainly comprising silicon. The amorphous layer means a layer in which atoms do not form a crystal having a regular and periodical arrangement and are solid. The anode active material layer can be an amorphous silicon layer.

The average thickness of the anode active material layer can be 0.1 μm or more and 100 μm or less. It is preferably 1 μm or more and 50 μm or less, and more preferably 2 μm or more and 10 μm or less. When the anode active material layer is too thin, a sufficient discharge capacity may not be obtained. On the other hand, when the anode active material layer it too thick, the capacity utilization rate of the anode may decrease.

For each of the layers constituting the oxide all-solid-state battery according to the disclosed embodiments, the thickness is a value obtained by measuring the thicknesses of 3 to 10 points of the layer by means of an electron microscope, etc., and averaging the results (measured thicknesses).

(2) The Solid Electrolyte Layer

The solid electrolyte layer is a layer mainly comprising the garnet-type oxide solid electrolyte sintered body (hereinafter, it may be simply referred to as "sintered body") represented by the following formula (1):

Formula (1):

As used herein, "mainly comprising the garnet-type oxide solid electrolyte sintered body" means that the garnet-type oxide solid electrolyte sintered body represented by the formula (1) accounts for more than 50% by mass of the total mass of the solid electrolyte layer.

The composition ratio (x−3y−z) of the lithium shown in the above formula (1) is a real number in a range of from 5 to 7. Since the composition ratio of the lithium is in this range, the lithium ion conductivity of the solid electrolyte layer can be kept high. When the composition ratio of the lithium is more than 7, the crystal structure of the sintered body changes from a cubic structure to a tetragonal structure and impairs crystallite symmetry. As a result, the lithium ion conductivity of the solid electrolyte layer is considered to deteriorate. On the other hand, when the composition ratio of the lithium is less than 5, the lithium is less likely to enter the crystal structure of the sintered body and results in a decrease in lithium occupancy. As a result, the lithium ion conductivity of the solid electrolyte layer is considered to decrease.

The element L in the formula (1) is not particularly limited, as long as it is at least one kind of element selected from an alkaline-earth metal element and a lanthanoid element. Whichever element is selected, the difference in the crystal structure of the sintered body is small, and the resulting sintered body obtains excellent ion conductivity. As the alkaline-earth metal element, examples include, but are not limited to, Ca, Sr, Ba and Ra. As the element L, La is preferred since better ion conductivity is obtained.

The composition ratio of the element L (the real number α in the formula (1)) is a real number of 2.5 or more and 3.5 or less.

The element M in the formula (1) is not particularly limited, as long as it is at least one kind of element selected from a transition element that can be six-coordinated with oxygen and typical elements in the Groups 12 to 15. Whichever element is selected, the difference in the crystal structure of the sintered body is small, and the resulting sintered body obtains excellent ion conductivity.

The element M is preferably Sc, Y, Ti, Zr, Hf, V, Nb, Ta, Cr, Mo, W, Mn, Fe, Co, Ni, Cu, Zn, Cd, Al, Ga, Ge, Sn, Sb, Bi, etc.

The element M is more preferably at least one kind of element selected from the group consisting of Zr, Nb and Ta. This is because, since these elements has a relatively large ionic radius, a contraction in crystal lattice can be suppressed and, as a result, a deterioration in lithium ion conductivity can be suppressed.

The element M is still more preferably at least one element selected from Zr and Nb.

The composition ratio of the element M (the real number β in the formula (1)) is a real number of 1.5 or more and 2.5 or less.

The sintered body can contain at least one element selected from Al and Ga as the element E. By setting the composition ratio of the element E (the real number y in the formula (1)) to less than 0.22, the crystal structure of the sintered body can be stable.

The sintered body can contain a proton. The composition ratio of the proton (the real number z in the formula (1)) is less than 2.0. As long as the proton is in the range of the composition ratio, the difference in the crystal structure of the sintered body is small, and the sintered body can be obtained by heating at lower heating temperature than ever before.

The composition ratio of oxygen atoms (the real number γ in the formula (1)) is a real number of 11 or more and 13 or less.

As the sintered body, examples include, but are not limited to, $Li_{6.75}La_3Zr_{1.75}Nb_{0.25}O_{12}$, $Li_{6.4}La_3Zr_{1.4}Nb_{0.6}O_{12}$, $Li_{6.5}La_3Zr_{1.7}Nb_{0.3}O_{12}$, $(Li_{6.2}Al_{0.2})La_3Zr_{1.7}Nb_{0.3}O_{12}$, $(Li_{6.2}Ga_{0.2})La_3Zr_{1.7}Nb_{0.3}O_{12}$, and $Li_{5.4}H_{1.4}La_3Zr_{1.7}Nb_{0.3}O_{12}$.

The crystallinity of the sintered body is not particularly limited and can be any one of monocrystalline, polycrystalline and amorphous.

The average thickness of the solid electrolyte layer is not particularly limited, as long as it is a thickness in a range that is generally selected as the average thickness of the solid electrolyte layer of an all-solid-state battery. The average thickness of the solid electrolyte layer can be 0.1 μm or more and 100 μm or less. It is preferably 1 μm or more and 50 μm or less, and more preferably 2 μm or more and 30 μm or less. When the solid electrolyte layer is too thin, a short circuit may easily occur between the electrodes. On the other hand, when the solid electrolyte layer is too thick, an increase in resistance occurs and may result in poor discharge performance.

In the case of differentiating the solid electrolyte layer by, for example, line analysis (an elemental analysis method) using SEM-EDX, a part where O, the element L (such as La) and the element M (such as Zr) are heavily detected, can be said to be the solid electrolyte layer. However, it cannot be said that the whole of the part where these elements are heavily present is the solid electrolyte layer. For example, the solid electrolyte layer and the solid electrolyte interface layer can be differentiated from each other by the presence and absence of the Si element. In the part where O, the element L and the element M are heavily detected, a part where the Si element is present can be determined as the solid electrolyte interface layer, and a part where the Si element is not present can be determined as the solid electrolyte layer.

(3) The Solid Electrolyte Interface Layer

The solid electrolyte interface layer comprises at least a Si element and an O element. These two kinds of elements can be confirmed by, for example, elemental analysis using SEM-EDX. The solid electrolyte interface layer may be such a layer that oxygen is diffused in silicon.

In addition to the two elements, the solid electrolyte interface layer can further comprise a Li element. By containing the Li element, the lithium ion conductivity between the solid electrolyte layer and the anode active material layer is increased and enables excellent charge and discharge of a battery. The Li element in the solid electrolyte interface layer can be confirmed by, for example, a known measurement method such as micro X-ray or secondary ion mass spectrometry (SIMS).

As shown in the below-described FIG. 2, the solid electrolyte interface layer was confirmed to have a crystal structure that the anode active material layer and the solid electrolyte layer do not have. The crystal structure of the solid electrolyte interface layer can be confirmed by X-ray diffractometry (XRD). Since the solid electrolyte interface layer is a very thin layer, it is difficult to cut out only the solid electrolyte interface layer for use in XRD. Therefore, in general, the laminate comprising at least the anode active material layer, the solid electrolyte interface layer and the solid electrolyte layer is subjected to XRD measurement. XRD measurement conditions are as follows, for example:

X-ray diffraction measurement device: Powder X-ray diffractometer (such as RINT-2500 (product name, manufactured by Rigaku Corporation))

Characteristic X-rays: CuKα irradiation
Measurement range: $2\theta=10°$ to $80°$
Measurement interval: $0.02°$
Sweep rate: $2°$/min
Measurement voltage: 50 kV
Measurement current: 300 mA The laminate has peaks at positions where $2\theta=32.3°$, $37.6°$, $43.8°$, and $57.7°$ in the XRD spectrum obtained by the XRD measurement. These peaks are preferably assigned to the solid electrolyte interface layer formed between the anode active material layer and the solid electrolyte layer. As shown in the below-described FIG. 2, these peaks differ from the peak derived from the anode active material layer and the peak derived from the solid electrolyte layer. Therefore, they are not assigned to the anode active material layer and the solid electrolyte layer. Also, as shown in FIG. 2, in terms of half-width, these peaks differ from the peak derived from the anode active material layer and the peak derived from the solid electrolyte layer.

The position of each peak may have a slight margin. The allowable margin is a margin of $\pm 0.5°$ of the value of $2\theta$. For the value of $2\theta$ in the disclosed embodiments, "$\pm 0.5°$" means the allowable range of the margin of the value of $2\theta$.

The average thickness of the solid electrolyte interface layer can be 1 nm or more and 1,000 nm or less. It is preferably 10 nm or more and 900 nm or less, and more preferably 200 nm or more and 800 nm or less.

When the solid electrolyte interface layer is too thin, the joint strength between the anode active material layer and the solid electrolyte layer may be weak. On the other hand, when the solid electrolyte interface layer is too thick, the distance between the anode active material layer and the solid electrolyte layer is increased and may result in an increase in battery resistance.

In the disclosed embodiments, two materials that are absolutely different in properties, that is, metal (silicon) and ceramics (the garnet-type oxide solid electrolyte sintered body) are joined by the solid electrolyte interface layer. The joint strength is much higher than a joint strength in a laminate obtained by forming a silicon active material layer on the surface of a garnet-type oxide solid electrolyte by a gas phase method (the below-described Reference Example 1). Moreover, the solid electrolyte interface layer has excellent ion conductivity and is effective in decreasing the electrical resistance of an interface between the anode active material layer and the solid electrolyte layer.

In the case of differentiating the solid electrolyte interface layer by, for example, line analysis (an elemental analysis method) using SEM-EDX, a part where O and Si are relatively heavily detected and the element L (such as La) and the element M (such as Zr) are slightly detected, can be said to be the solid electrolyte interface layer. However, it cannot be said that the whole of the part where these elements are present, is the solid electrolyte interface layer. For example, as described above, when it is difficult to differentiate between the anode active material layer and the solid electrolyte interface layer, the boundary between the two layers can be determined as the part where the Si element is present and where the element derived from the solid electrolyte interface layer (such as oxygen) accounts for the largest proportion. Also, as described above, the solid electrolyte layer and the solid electrolyte interface layer can be differentiated from each other by the presence and absence of the Si element.

(4) The Cathode Active Material Layer

The cathode active material layer is not particularly limited, as long as it is a layer containing a cathode active material. The cathode active material is not particularly limited, as long as it releases lithium ions at the time of discharge, when it is used in combination with the anode active material layer. As the cathode active material, examples include, but are not limited to, a lithium metal, $LiCoO_2$, $LiMnO_2$, $Li_2NiMn_3O_8$, $LiVO_2$, $LiCrO_2$, $LiFePO_4$, $LiCoPO_4$, $LiNiO_2$, and $LiNi_{1/3}Co_{1/3}Mn_{1/3}O_2$.

As needed, the cathode active material layer can contain an electroconductive material, a solid electrolyte material, a binder, etc.

(5) Others

As the material for the cathode current collector, examples include, but are not limited to, SUS, aluminum, nickel, iron, titanium and carbon. Of them, SUS is preferred.

As the material for the anode current collector, examples include, but are not limited to, gold, SUS, copper, nickel and carbon. Of them, gold is preferred.

The thickness, shape and so on of the cathode and anode current collectors can be appropriately selected, depending on the intended application, etc., of the oxide all-solid-state battery.

2. The Method for Producing the Oxide All-solid-state Battery

The production method according to the disclosed embodiments is a method for producing the above-described oxide all-solid-state battery, the method comprising the steps of: attaching a liquid silicon material to at least a part of a surface of the garnet-type oxide solid electrolyte represented by the formula (1), and heating the garnet-type oxide solid electrolyte to which the liquid silicon material is attached, in an inert atmosphere and a temperature condition of 400° C. or more and 500° C. or less.

The production method according to the disclosed embodiments comprises (1) the step of attaching the liquid silicon material to the garnet-type oxide solid electrolyte and (2) the heating step. The production method according to the disclosed embodiments is not limited to these two steps. For example, it can comprise a step of synthesizing the garnet-type oxide solid electrolyte before the step (1). It can further comprise other steps after the step (2), such as a step of forming the cathode active material layer on the sintered body and a step of providing current collectors.

Hereinafter, the step (1), the step (2) and other steps will be described in order.

(1) The Step of Attaching the Liquid Silicon Material to the Garnet-Type Oxide Solid Electrolyte The garnet-type oxide solid electrolyte used as a raw material is not particularly limited, as long as it contains the composition represented by the above formula (1). In the disclosed embodiments, the garnet-type oxide solid electrolyte can be synthesized in advance before the step (1) and then used in the step (1), or a commercially-available garnet-type oxide solid electrolyte can be used in the step (1). The garnet-type oxide solid electrolyte can be synthesized by a solid phase reaction method, for example.

As the garnet-type oxide solid electrolyte, examples include, but are not limited to, $Li_{6.75}La_3Zr_{1.75}Nb_{0.25}O_{12}$, $Li_{6.4}La_3Zr_{1.4}Nb_{0.6}O_{12}$, $Li_{6.5}La_3Zr_{1.7}Nb_{0.3}O_{12}$, $(Li_{6.2}Al_{0.2})La_3Zr_{1.7}Nb_{0.3}O_{12}$, $(Li_{6.2}Ga_{0.2})La_3Zr_{1.7}Nb_{0.3}O_{12}$, and $Li_{5.4}H_{1.4}La_3Zr_{1.7}Nb_{0.3}O_{12}$.

The crystallinity of the garnet-type oxide solid electrolyte is not particularly limited and can be any one of monocrystalline, polycrystalline and amorphous.

In the disclosed embodiments, the "liquid silicon material" means a liquid containing at least one selected from the group consisting of a low-order silane compound, a low-order silane composition, a high-order silane compound and a high-order silane composition.

(Low-order Silane Compound)

The low-order silane compound means a silane or halogenated silane compound with a relatively small molecular weight. The low-order silane compound is preferably one that is in a gas or liquid state at normal temperature and under normal pressure. For example, the low-order silane compound is preferably a silane or halogenated silane compound containing one or more cyclic structures per molecule. It is more preferably at least one kind of silane compound selected from the group consisting of a compound represented by the following formula (i) and a compound represented by the following formula (ii):

   Formula (i):

   Formula (ii):

where X is a hydrogen atom or a halogen atom; i is an integer of from 3 to 8; and j is an integer of from 4 to 14.

The below-described high-order silane compound is obtained by polymerizing a low-order silane compound. As the low-order silane compound, examples include, but are not limited to, a low-order silane compound that can be polymerized into a high-order silane compound by light irradiation, electron beam irradiation, heating, etc. Preferred is a low-order silane compound that can be changed into a high-order silane compound by light irradiation (especially by ultraviolet irradiation) (that is, a photopolymerizable low-order silane compound).

The ultraviolet light applied to the low-order silane compound is preferably a light at a wavelength that can certainly polymerize the low-order silane compound. The wavelength is preferably in a range of from 200 to 500 nm, and more preferably from 254 to 420 nm. By using ultraviolet light with such a wavelength range, the low-order silane compound can be certainly polymerized.

The irradiation intensity of the ultraviolet light is not particularly limited. It is preferably in a range of from about 0.1 to 5,000 mW/cm$^2$, and more preferably in a range of from about 0.5 to 3,000 mW/cm$^2$. The ultraviolet irradiation time is not particularly limited. It is preferably about 10 seconds to 20 hours, and more preferably about 5 minutes to 10 hours. By ultraviolet irradiation at such an irradiation intensity and for the irradiation time, the polymerization can be quickly facilitated, and the amount of the highly volatile, low-molecular-weight silane compound remaining in the high-order silane compound, can be decreased.

The compound represented by the formula (i) is a silane or halogenated silane compound containing one cyclic structure per molecule. The compound represented by the formula (ii) is a silane or halogenated silane compound containing two cyclic structures per molecule.

As the compound represented by the formula (i), examples include, but are not limited to, cyclotrisilane, cyclotetrasilane, cyclopentasilane, cyclohexasilane and cycloheptasilane. As the compound represented by the formula (ii), examples include, but are not limited to, 1,1'-bicyclobutasilane, 1,1'-bicyclopentasilane, 1,1'-bicyclohexasilane, 1,1'-bicycloheptasilane, 1,1'-cyclobutasilylcyclopentasilane, 1,1'-cyclobutasilylcyclohexasilane, 1,1'-cyclobutasilylcycloheptasilane, 1,1'-cyclopentasilylcyclohexasilane, 1,1'-cyclopentasilylcycloheptasilane, 1,1'-cyclohexasilylcycloheptasilane, spiro[2.2]pentasilane, spiro[3.3]heptasilane, spiro[4.4]nonasilane, spiro[4.5]decasilane, spiro[4.6]undecasilane, spiro[5.5]undecasilane, spiro[5.6]dodecasilane, and spiro[6.6]tridecasilane. Part or all of the hydrogen atoms of the compounds can be each substituted with a SiH$_3$ group or halogen atom. Also, "i" in the formula (i) is preferably an integer of from 3 to 7, and "j" in the formula (ii) is preferably an integer of from 4 to 7. These compounds can be used alone or in combination of two or more. These low-order silane compounds are highly photo-sensitive compounds that enables efficient photopolymerization. It is particularly preferable to use at least one selected from the group consisting of cyclotetrasilane, cyclopentasilane, cyclohexasilane and cycloheptasilane, from the viewpoint of easy synthesis and purification.

As needed, the low-order silane compound can contain a silane compound not containing a cyclic structure (e.g., pentasilane, hexasilane, heptasilane, polydihydrosilane), a modified silane compound modified by a metal atom (e.g., boron atom, phosphorus atom, aluminum atom) or the like, etc., as long as the photopolymerization process by the ultraviolet irradiation is not disturbed. The content of the silane compound not containing a cyclic structure, the modified silane compound or the like preferably accounts for 30% by mass or less, and more preferably 15% by mass, of the total amount of the low-order silane compound and the silane compound not containing a cyclic structure, the modified silane compound or the like.

(Low-order Silane Composition)

The low-order silane composition means a liquid containing the low-order silane compound, or it means the low-order silane compound itself. The low-order silane composition can also contain a solvent as a diluent.

The solvent is not particularly limited. As the solvent, examples include, but are not limited to, decalin, tetralin, benzene, methylnaphthalene, pentane, hexane, heptane, octane, nonane, decane, undecane, dodecane, tridecane, tetradecane, pentadecane, hexadecane, toluene, xylene, trimethylbenzene, cyclopentane, cyclopentene, cyclohexane, cyclohexene, cycloheptane, cycloheptene, cyclooctane, cyclooctene, cyclononane, cyclononene, and mixtures thereof.

The low-order silane composition can further contain other additive, as long as the effect of the disclosed embodiments is not diminished. As the other additive, examples include, but are not limited to, a dopant source.

As the dopant source, examples include, but are not limited to, a substance containing a group IIIB element in the periodic table, and a substance containing a group VB element in the periodic table (e.g., phosphorus, boron, arsenic). Since the high-order silane composition of the disclosed embodiments contains such a substance, an amorphous or polycrystalline silicon with which the elements are doped, can be obtained. As the dopant source, examples include, but are not limited to, substances provided in Japanese Patent Application Laid-Open No. 2000-31066. The concentration of the dopant source in the low-order silane composition is appropriately selected, depending on the dopant concentration finally required of the thus-obtained amorphous or polycrystalline silicon.

(High-order Silane Compound)

The high-order silane compound means a polymer compound having an element ratio represented by the general formula $SiX_m$ (where X is a hydrogen atom or halogen atom, and m is a number of from 1 to 3). In the general formula, m is preferably from 1.5 to 2.5.

The polymerization degree of the high-order silane compound is the average value of the numbers (n's) of silicon atoms contained in the molecules of the high-order silane compound. It is preferably 5 or more, and more preferably 8 or more. The polymerization degree (the average value of the n's) can be obtained by calculation, as a value obtained by dividing the weight average value of absolute molecular amounts (the weight average absolute molecular amount) measured by a gel permeation chromatography multi-angle laser light scattering (GPC-MALLS) method, by the formula weight of $SiX_2$ (X means the same as that in the above-mentioned formula).

The method for producing the high-order silane compound is not particularly limited. For example, the high-order silane compound can be obtained by using the above-described low-order silane compound, which is a precursor of the high-order silane compound, as a starting raw material, and polymerizing the low-order silane compound.

The high-order silane compound can contain a small amount of low-order silane compound, as long as it is kept in a liquid or solid state at normal temperature and under normal pressure. As the low-order silane compound, examples include, but are not limited to, the above-mentioned low-order silane compounds. The content of the low-order silane compound preferably accounts for 50% by mass or less, and more preferably 20% by mass or less, of the total amount of the high-order silane compound and the low-order silane compound.

The high-order silane compound can contain the above-mentioned silane compound not containing a cyclic structure, the above-mentioned modified silane compound, etc., as long as the photopolymerization process by the ultraviolet irradiation is not disturbed. The content of the silane compound not containing a cyclic structure, the modified silane compound or the like preferably accounts for 30% by mass or less, and more preferably 15% by mass or less, of the total amount of the high-order silane compound and the silane compound not containing a cyclic structure, the modified silane compound or the like.

(High-order Silane Composition)

The high-order silane composition means a liquid containing the high-order silane compound, or it means the high-order silane compound itself. The high-order silane composition can also contain a solvent as a diluent. As the solvent, examples include, but are not limited to, the above-exemplified solvents that can be used in the low-order silane composition.

The high-order silane composition can further contain other additive, as long as the effect of the disclosed embodiments is not diminished. As the other additive, examples include, but are not limited to, the above-mentioned dopant source.

The concentration of the solute (the low-order or high-order silane compound) in the low-order or high-order silane composition can be controlled depending on the thickness of the target anode active material layer. For example, the concentration of the solute can be from about 1 to 80% by mass. When the concentration of the solute is more than 80% by mass, the high-order silane compound or, among the low-order silane compounds, a high-molecular-weight one is likely to precipitate, and it may be difficult to form the anode active material layer uniform in thickness.

The viscosity of the liquid silicon material can be controlled depending on the thickness of the target anode active material layer. For example, the viscosity of the liquid silicon material can be from 0.5 to 100 mPa·s. When the viscosity of the liquid silicon material is smaller than 0.5 mPa·s, it may be difficult to attach the liquid silicon material to the surface of the garnet-type oxide solid electrolyte. When the viscosity of the liquid silicon material is more than 100 mPa·s, it may be difficult to form the anode active material layer uniform in thickness.

As needed, a surface tension controlling material can be added to the liquid silicon material. As the material, examples include, but are not limited to, a fluorine-based material, a silicone-based material and a non-ionic material. Of them, the non-ionic surface tension controlling material is effective in increasing the garnet-type oxide solid electrolyte wetting property (wettability) of the liquid silicon material, increasing the smoothness of the anode active material layer thus formed, and preventing the anode active material layer thus formed from surface roughening.

An advantage of the use of the liquid silicon material is such that the contact area between a silicon anode and the garnet-type oxide solid electrolyte can be freely controlled, and the joint strength between the materials can be increased higher than ever before.

For example, when silicon particles are simply attached to the surface of the garnet-type oxide solid electrolyte, the two materials are in point contact with each other and results in a small contact area. Also in this case, the joint strength between the two materials is small; therefore, the silicon particles are readily detached from the garnet-type oxide solid electrolyte.

When a silicon layer is formed on the surface of the garnet-type oxide solid electrolyte by a gas phase method (e.g., a sputtering method), a certain amount of contact area can be obtained between the two materials. However, in terms of the scale of a production device, there is an upper limit to the contact area that can be obtained by the gas phase method. There is no difference between this case and the above-mentioned case of using the silicon particles, in that the silicon layer is simply disposed on the surface of the garnet-type oxide solid electrolyte. Therefore, even in this case, the joint strength is weak, and the silicon layer is readily detached from the surface of the garnet-type oxide solid electrolyte. In addition, the gas phase method is not a practical battery production method since it is a time-consuming, costly method.

As just described, there is no conventional method of efficiently and strongly joining the garnet-type oxide solid electrolyte (ceramics) and silicon (metal).

Meanwhile, in the disclosed embodiments, by attaching the liquid silicon material to the surface of the garnet-type oxide solid electrolyte, the contact area between the materials can be efficiently obtained. By controlling the attached area, the contact area can be readily changed, and there is no upper limit to the contact area. Since the solid electrolyte interface layer is formed through the below-described heating step, the joint strength between the garnet-type oxide solid electrolyte sintered body and the anode active material layer is increased much higher than ever before.

As just described, in terms of contact area, joint strength and production efficiency, the use of the liquid silicon material is better than the use of the silicon particles and the gas phase method.

The part to which the liquid silicon material is attached, is not particularly limited, as long as it is at least a part of the surface of the garnet-type oxide solid electrolyte. By controlling the area of the part to which the liquid silicon material is attached, the area of the thus-obtained anode active material layer can be readily changed.

(2) Heating Step

The garnet-type oxide solid electrolyte to which the liquid silicon material is attached, is heated in an inert atmosphere. The "inert atmosphere" means the presence of a gas that is, when heated, inactive with respect to both the liquid silicon material and the garnet-type oxide solid electrolyte. As the inert atmosphere, examples include, but are not limited to, an argon atmosphere and a nitrogen atmosphere.

The heating temperature is from 400° C. or more and 500° C. or less, preferably 400° C. or more and 480° C. or less, and more preferably 400° C. or more and 450° C. or less. As just described, by decreasing the heating temperature lower than ever before, the silicon-containing anode active material layer and the garnet-type oxide solid electrolyte can be sintered together.

When the heating temperature is less than 400° C., the joining of the silicon and the garnet-type oxide solid electrolyte is not sufficiently facilitated, and the solid electrolyte interface layer is insufficiently formed. On the other hand, when the heating temperature is more than 500° C., the silicon in the liquid silicon material is oxidized into silicon dioxide and makes it impossible to charge and discharge a battery. When the heating temperature is too high, a solid electrolyte interface layer is crystallized too much and changed into a layer with a different crystal structure.

The heating time is 5 minutes or more and 3 hours or less, for example.

By heating the garnet-type oxide solid electrolyte to which the liquid silicon material is attached, not only the anode active material layer derived from the silicon in the liquid silicon material is formed, but also the solid electrolyte interface layer is formed between the anode active material layer and the garnet-type oxide solid electrolyte. The solid electrolyte interface layer is considered to be formed by a chemical reaction between the liquid silicon material and the garnet-type oxide solid electrolyte. The solid electrolyte interface layer provides excellent joint strength and lithium ion conductivity to the interface between the anode active material layer and the garnet-type oxide solid electrolyte sintered body. Therefore, an oxide all-solid-state battery thus obtained obtains excellent charge and discharge properties.

(3) Other Steps

The cathode active material layer can be formed on the surface of the sintered body after the step (2). As the material for the cathode active material layer, examples include, but are not limited to, the above-described cathode active materials. As the method for producing the cathode active material layer, examples include, but are not limited to, a thermal deposition method. By forming the cathode active material layer, for example, an oxide all-solid-state battery having a layer structure as shown in FIG. 1 is produced.

An anode current collector can be formed on a surface of the anode active material layer formed by the step (2). As the material for the anode current collector, examples include, but are not limited to, the above-mentioned materials such as gold. As the method for forming the anode current collector, examples include, but are not limited to, an electron beam evaporation method.

A cathode current collector can be formed on a surface of the cathode active material layer. As the material for the cathode current collector, examples include, but are not limited to, the above-mentioned materials such as SUS.

EXAMPLES

Hereinafter, the disclosed embodiments will be described further in detail, by way of examples. However, the disclosed embodiments are not limited to the following examples.

1. Production of Oxide All-solid-state Battery

Example 1

First, a bulk polycrystal of an oxide solid electrolyte ($Li_{6.75}La_3Zr_{1.75}Nb_{0.25}O_{12}$; hereinafter it may be referred to as LLZ) was produced by a solid phase reaction method.

Next, a liquid silicon material was prepared, with reference to Japanese Patent Application Laid-Open Nos. 2010-159191 and 2000-31066.

Then, one surface of the bulk polycrystal of the LLZ, was immersed in the liquid silicon material.

Next, the bulk polycrystal of the LLZ immersed in the liquid silicon material, was sintered for 30 minutes in an argon atmosphere and a temperature condition of 400° C., thereby producing a Si-LLZ sintered body.

Gold was deposited on a Si side of the Si-LLZ sintered body by an electron beam evaporation method, thereby forming a gold electrode (an anode current collector). Lithium was thermally deposited on the opposite side to the side where the Si was present of the Si-LLZ sintered body, thereby forming a lithium electrode (a cathode active material layer).

An oxide all-solid-state battery of Example 1 was produced by the above steps, the battery having the layer structure of Au—Si-LLZ-Li.

The Si side of the Si-LLZ sintered body used in Example 1, was strongly scratched. As a result, the Si was not detached from the LLZ. Therefore, it is clear that the Si and LLZ of the Si-LLZ sintered body were strongly joined.

Comparative Example 1

First, a bulk polycrystal of a LLZ was prepared in the same manner as Example 1.

Next, a silicon powder was placed on one side of the bulk polycrystal of the LLZ, thereby producing a Si-LLZ laminate. The Si-LLZ laminate was heated at 600° C. to produce a sintered body.

Then, an anode current collector and a cathode active material layer were formed in the same manner as Example 1, thereby producing an oxide all-solid-state battery of Comparative Example 1, the battery having the layer structure of Au—Si-LLZ-Li.

The Si side of the Si-LLZ laminate used in Comparative Example 1 was lightly scratched. As a result, the Si was readily detached from the LLZ. Therefore, for the Si-LLZ laminate, it was confirmed that the silicon particles do not have a physical or chemical bond with the LLZ.

Reference Example 1

First, a bulk polycrystal of a LLZ was prepared in the same manner as Example 1.

Next, a silicon layer was formed on one side of the bulk polycrystal of the LLZ by a sputtering method.

Then, an anode current collector and a cathode active material layer were formed in the same manner as Example 1, thereby forming an oxide all-solid-state battery of Reference Example 1, the battery having the layer structure of Au—Si-LLZ-Li.

The Si side of the Si-LLZ laminate used in Reference Example 1 was lightly scratched. As a result, the Si was readily detached from the LLZ. Therefore, for the Si-LLZ laminate, it was confirmed that the silicon layer does not have a physical or chemical bond with the LLZ.

Reference Example 2

First, a bulk polycrystal of a LLZ was prepared in the same manner as Example 1.

Next, a lithium electrode was formed on one side of the bulk polycrystal of the LLZ in the same manner as Example 1. Another lithium electrode was formed on the other side of the bulk polycrystal of the LLZ in the same manner as Example 1.

An oxide all-solid-state battery (a symmetric cell) of Reference Example 2 was produced by the above steps, the battery having the layer structure of Li-LLZ-Li.

2. XRD Measurement of Si-LLZ Sintered Body

X-ray diffraction (XRD) measurement was carried out on the LLZ used in Example 1 and the Si-LLZ sintered body produced in Example 1. The measurement conditions are as follows.

X-ray diffraction measurement device: Powder X-ray diffractometer RINT-2500 (product name, manufactured by Rigaku Corporation)

Characteristic X-rays: CuKα irradiation
Measurement range: $2\theta=10$ to $80°$
Measurement interval: $0.02°$
Sweep rate: $2°$/min
Measurement voltage: 50 kV
Measurement current: 300 mA FIG. 2 is a view showing a XRD spectrum of the LLZ and that of the Si-LLZ sintered body. In FIG. 2, the XRD spectrum on the upper side is that of the Si-LLZ sintered body, and the XRD spectrum on the lower side is that of the LLZ. Also in FIG. 2, peaks common to both of the spectra are connected with a dashed line. For the XRD spectrum of the Si-LLZ sintered body, a peak assigned to a silicon crystal is indicated by a black rhombus, and a peak presumed to be assigned to the solid electrolyte interface (SEI) layer is indicated by a white circle.

Figure 2:
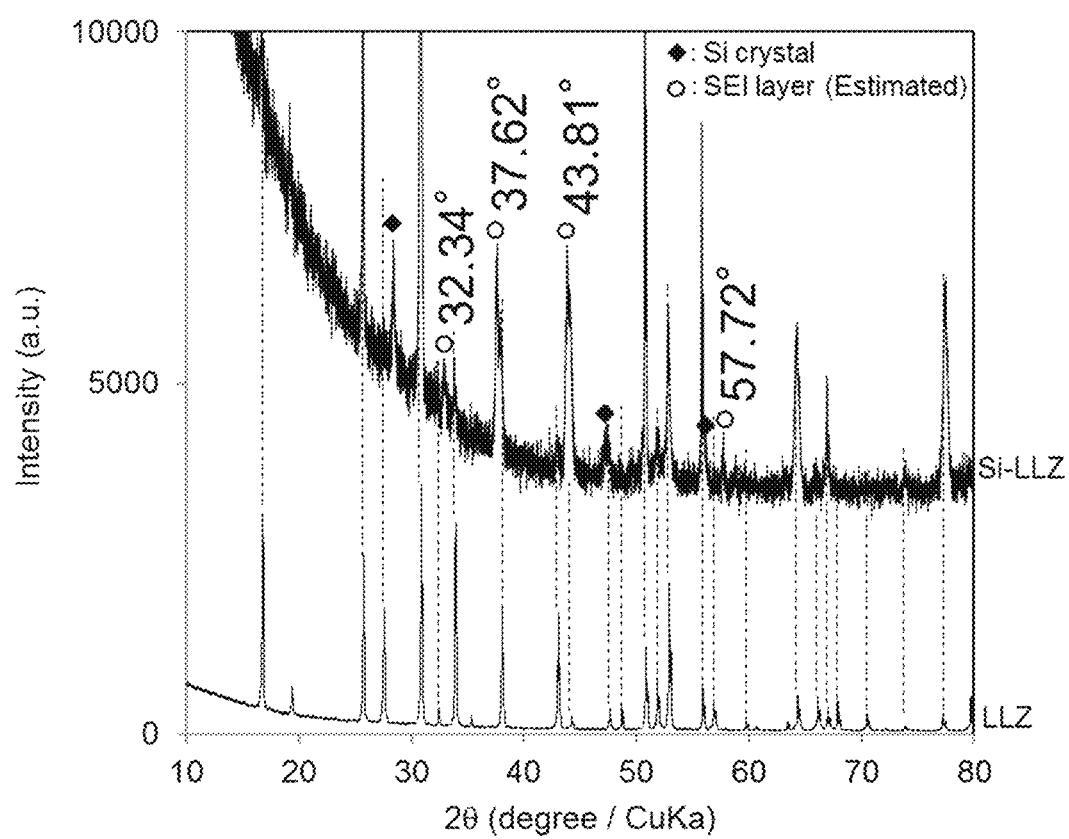
FIG. 2 is a view showing a XRD spectrum of a LLZ and that of a Si-LLZ sintered body.

As shown in FIG. 2, for the XRD spectrum of the Si-LLZ sintered body, peaks assigned to the LLZ ($2\theta=17.5°$, $26.5°$, $28.0°$, $30.0°$, $32.0°$, $33.5°$, $38.5°$, $43.0°$, $44.0°$, $48.0°$, $49.0°$, $50.5°$, $51.5°$, $52.5°$, $56.0°$, $57.0°$, $59.8°$, $64.5°$, $66.0°$, $67.0°$, $68.0°$, $70.5°$, $74.5°$, $78.0°$), peaks assigned to a silicon crystal ($2\theta=29.0°$, $48.0°$, $56.0°$) and peaks indicated by white circles ($2\theta=32.34°$, $37.62°$, $43.81°$, $57.72°$) were observed. Since these peaks are not assigned to both the silicon and LLZ (raw materials), they are presumed to be peaks derived from the solid electrolyte interface layer formed on the interface between the silicon and LLZ.

X-ray diffraction (XRD) measurement was carried out on the LLZ used in Comparative Example 1 and the Si-LLZ laminate produced in Comparative Example 1. The measurement conditions are the same as those of Example 1. The measurement temperature was changed to room temperature (15 to 30° C.), 600° C. and 800° C.

Figure 9:
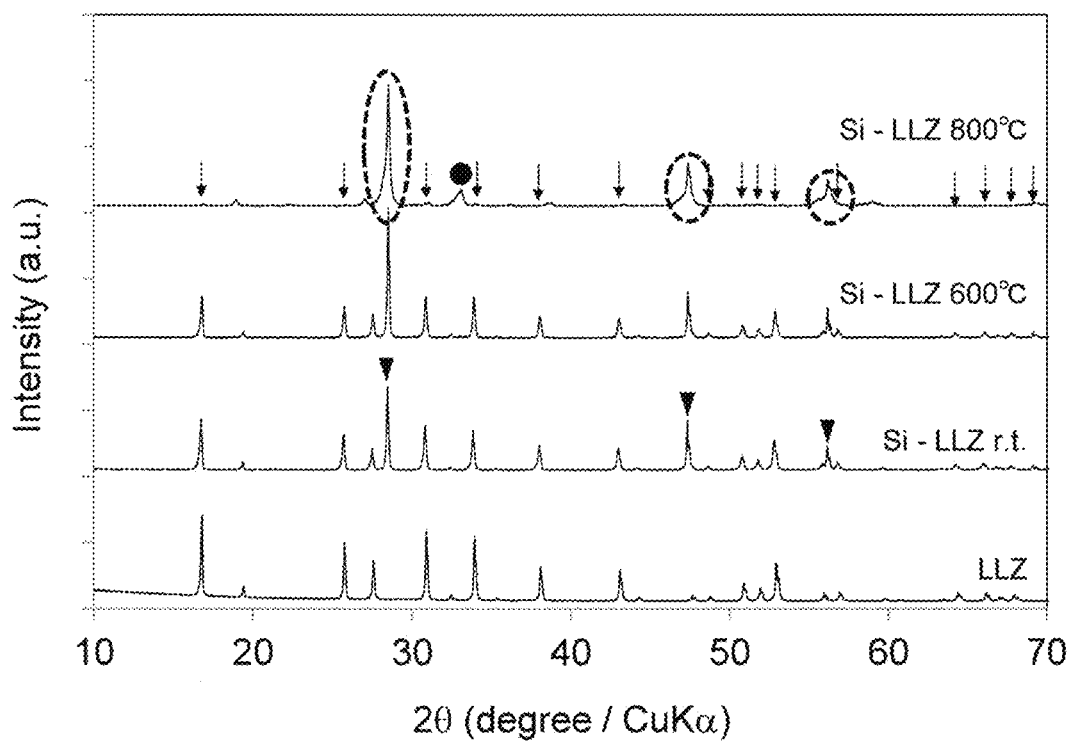
FIG. 9 is a view showing XRD spectra (800° C., 600° C. and room temperature) of a Si-LLZ laminate and a XRD spectrum of a LLZ.

FIG. 9 is a view showing, from down to up, a XRD spectrum of the LLZ, a XRD spectrum of the Si-LLZ laminate at room temperature (Si-LLZ r. t.), a XRD spectrum of the Si-LLZ laminate at a measurement temperature of 600° C. (Si-LLZ 600° C.), and a XRD spectrum of the Si-LLZ laminate at a measurement temperature of 800° C. (Si-LLZ 800° C.). A black upside-down triangle above the spectrum of the Si-LLZ r. t. corresponds to the peak indicated by the black rhombus shown in FIG. 2 and indicates a peak assigned to a silicon crystal.

First, the spectrum of the LLZ is compared to that of the Si-LLZ r. t. As a result, it can be confirmed that the Si and LLZ coexist at room temperature. However, as a result of comparing the spectrum of the Si-LLZ r. t. at 600° C., that of the Si-LLZ at 600° C., and that of the Si-LLZ at 800° C., it is clear that the peaks of the silicon crystal ($2\theta=29°$, $48°$, $56°$) are remarkably broad compared to other peaks. The broad peaks (peaks each shown in an ellipse indicated by dashed line) suggest the presence of $SiO_2$. For the spectrum of the Si-LLZ at 800° C., the peaks of the LLZ disappear (down-pointing arrows indicate peaks that disappeared) and a new unassignable peak (indicated by a black circle) appears.

As just described, for the Si-LLZ laminate, it is clear that when the Si powder and LLZ powder are heated together, the Si powder turns into $SiO_2$ at around 600° C. When heated to 800° C., the crystallinity of the LLZ is lost, and almost only the $SiO_2$ is observed in the XRD spectrum.

3. Charge-discharge Test of Oxide All-solid-state Batteries

A charge-discharge test of the oxide all-solid-state batteries of Example 1 and Reference Example 1 was carried out in the following conditions. When charging and discharging the batteries, impedance measurement was carried out at potentials of 0.3 V, 0.2 V and 0.1 V (vs. $Li^+/Li$). Devices and conditions used in the charge-discharge test and impedance measurement, are as follows:

Voltage measurement device: Multipotentiostat Solartron 1480 (product name, manufactured by Solartron Analytical)

AC voltage amplifier: Frequency response analyzer Solartron FRA1255B (product name, manufactured by Solartron Analytical)

Current density: 10 $\mu Acm^{-2}$

Voltage cut-off setting: 0.1 to 1 V

Thermostatic bath setting: 25° C.

AC impedance measurement setting: A voltage swing of 25 mV

Measurement frequency range: 1 MHz to 0.1 Hz

Figure 10:
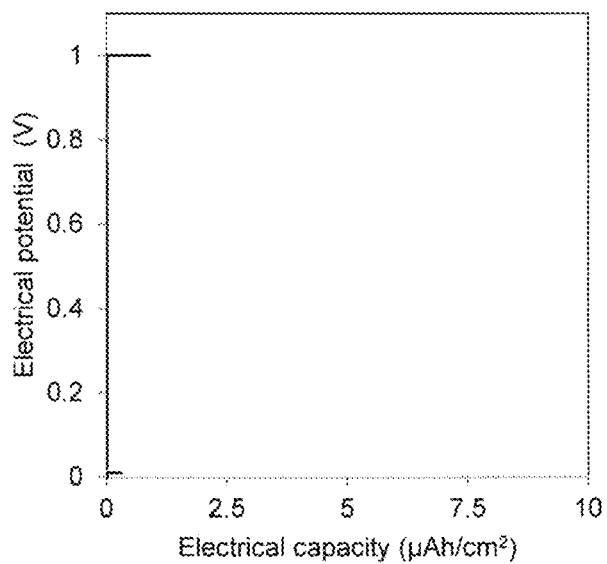
FIG. 10 shows charge and discharge curves of an oxide all-solid-state battery of Comparative Example 1.

FIG. 10 shows charge and discharge curves of the oxide all-solid-state battery of Comparative Example 1 (n=2). In FIG. 10, since no charge and discharge curves are found and the potential remains at 0, it is clear that the oxide all-solid-state battery of Comparative Example 1 cannot be charged and discharged. This fact indicates that when the Si-LLZ laminate is heated at 600° C., the Si turns into $SiO_2$ (quartz glass) and, as a result, the anode cannot be charged and discharged.

Figure 6:
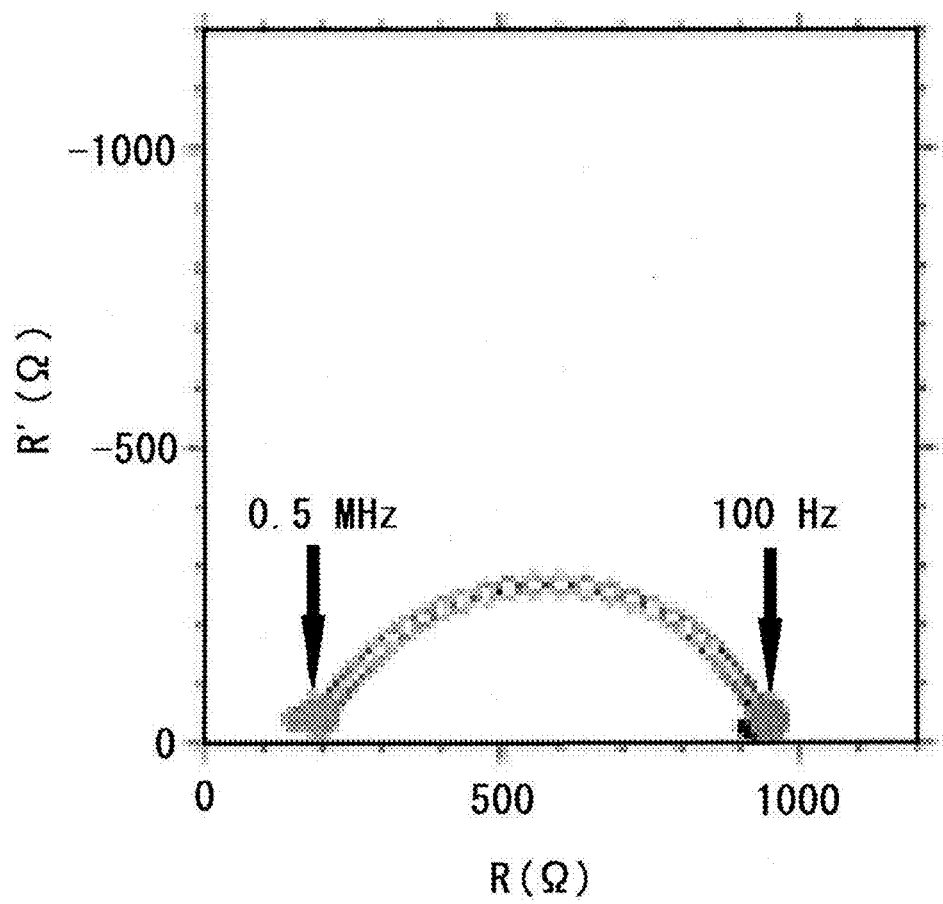
FIG. 6 is a Nyquist diagram showing results of impedance measurement of an oxide all-solid-state battery (symmetric cell) of Reference Example 2.

FIG. 6 is a Nyquist diagram showing the results of the impedance measurement of the oxide all-solid-state battery (symmetric cell) of Reference Example 2.

Since the oxide all-solid-state battery of Reference Example 2 is a symmetric cell, there are two possible resistance components: the resistance component of the LLZ and the resistance component of the Li-LLZ interface. It is known that a resistance component of 0.5 MHz or more is the resistance component of the LLZ. Therefore, as a result of considering the measurement results shown in FIG. 6 and the sectional area of the lithium in the symmetric cell, it is clear that the frequency characteristic of the Li-LLZ interface of Reference Example 2 is in a range of from 100 Hz to 0.5 MHz, and the resistance thereof is about 150 $\Omega cm^2$.

Figure 7:
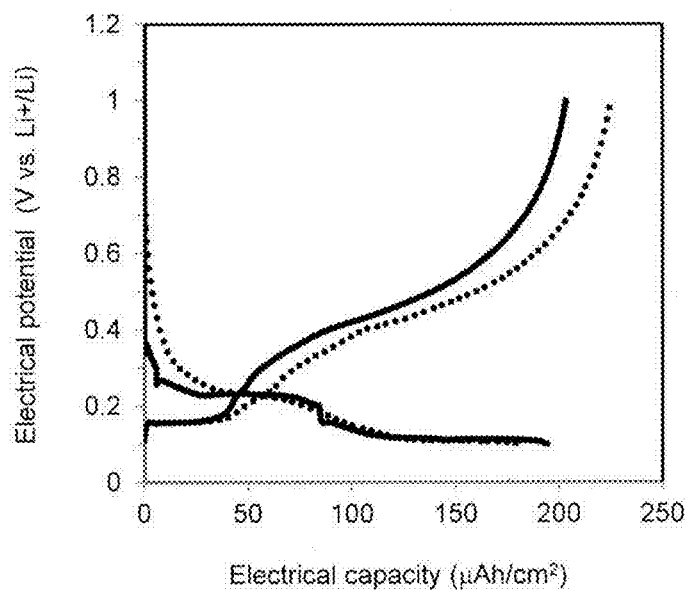
FIG. 7 shows charge and discharge curves of an oxide all-solid-state battery of Reference Example 1.
Figure 8A:
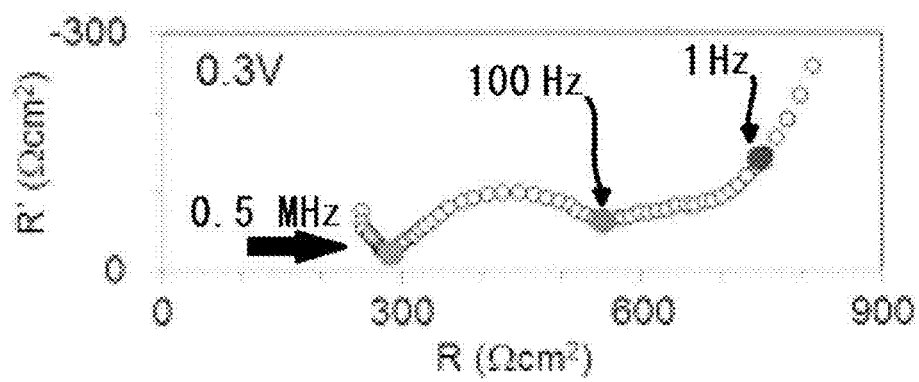
FIG. 8A is a Nyquist diagram showing results of impedance measurement of the oxide all-solid-state battery of Reference Example 1 at 0.3 V (vs. Li$^+$/Li)
Figure 8B:
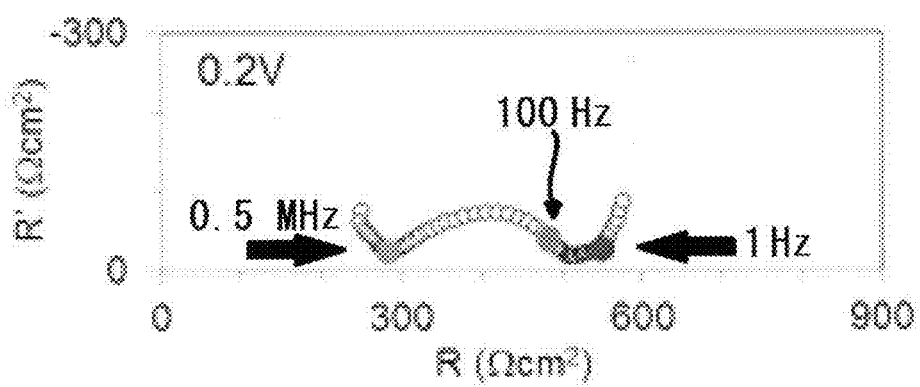
FIG. 8B is a Nyquist diagram showing results of impedance measurement of the oxide all-solid-state battery of Reference Example 1 at 0.2 V (vs. Li$^+$/Li)
Figure 8C:
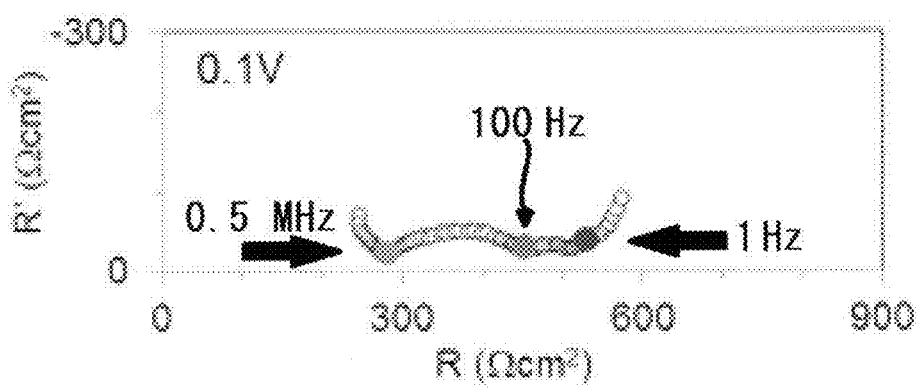
FIG. 8C is a Nyquist diagram showing results of impedance measurement of the oxide all-solid-state battery of Reference Example 1 at 0.1 V (vs. Li$^+$/Li)

FIG. 7 shows charge and discharge curves of the oxide all-solid-state battery of Reference Example 1. In FIG. 7, solid lines indicate the results of the first charge and discharge, and dashed lines indicate the results of the second charge and discharge. FIGS. 8A, 8B and 8C are Nyquist diagrams showing the results of the impedance measurement of the oxide all-solid-state battery of Reference Example 1 at 0.3 V (vs. $Li^+/Li$), 0.2 V (vs. $Li^+/Li$), and 0.1 V (vs. $Li^+/Li$), respectively.

For the oxide all-solid-state battery of Reference Example 1, there are three possible resistance components: the resistance component of the LLZ, the resistance component of the Li-LLZ interface, and the resistance component of the Si-LLZ interface. From the results shown in FIG. 6, it is clear that a resistance component of 0.5 MHz or more is the resistance component of the LLZ, and a resistance component in a range of from 100 Hz to 0.5 MHz is the resistance component of the Li-LLZ interface. Therefore, the frequency characteristic of the Si-LLZ interface is presumed to be in a range of from 1 to 100 Hz.

As a result of comparing FIGS. 8A to 8C, the following is clear: when the voltage moves to 0.3 V, 0.2 V and 0.1 V, there is not much change in the resistance component of 100 Hz and that of 0.5 MHz; however, there is a large change in the resistance component of 1 Hz. From this result and the fact that the LLZ separator (the resistance component of 0.5 MHz or more) and the Li-LLZ interface (the resistance component in a range of from 100 Hz to 0.5 MHz) do not show voltage dependency, the frequency characteristic of the Si-LLZ interface is presumed to be in a range of from 1 to 100 Hz.

Since the above two presumptions (the presumption from the result of FIG. 6 and the presumption based on voltage dependency) agree with each other, it is clear that the frequency characteristic of the Si-LLZ interface is in a range of from 1 to 100 Hz. This does not contradict the fact that the Si-LLZ interface has voltage dependency.

From FIGS. 8A to 8C, it is clear that the frequency characteristic of the Li-LLZ interface of Reference Example 1 is in a range of from 1 to 100 Hz, and the resistance thereof is about 150 $\Omega cm^2$.

Figure 3:
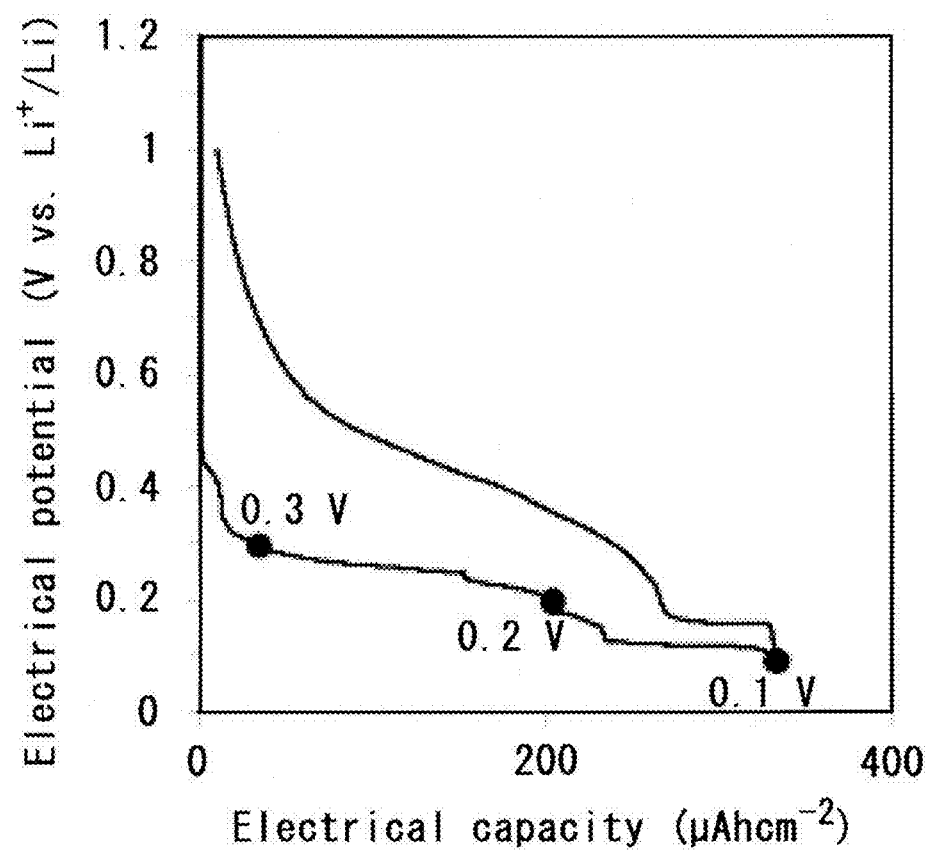
FIG. 3 shows charge and discharge curves of an oxide all-solid-state battery of Example 1.
Figure 4A:
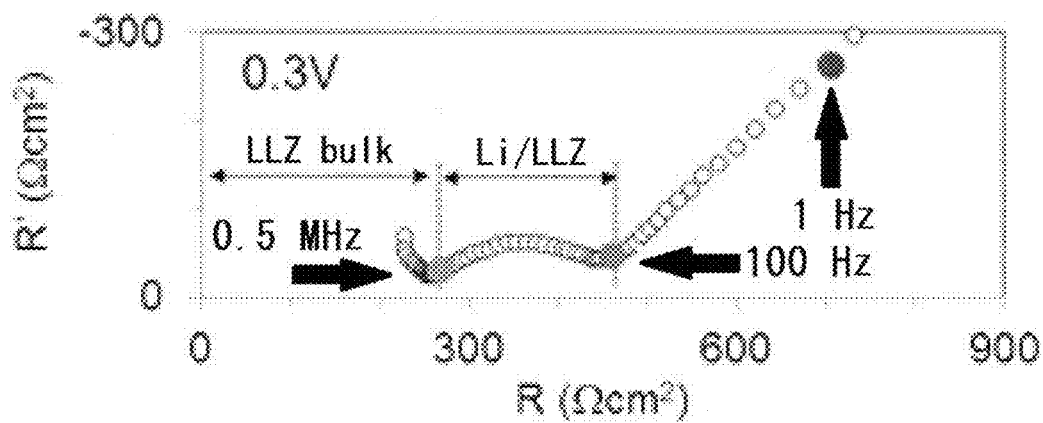
FIG. 4A is a Nyquist diagram showing results of impedance measurement of the oxide all-solid-state battery of Example 1 at 0.3 V (vs. Li$^+$/Li)
Figure 4B:
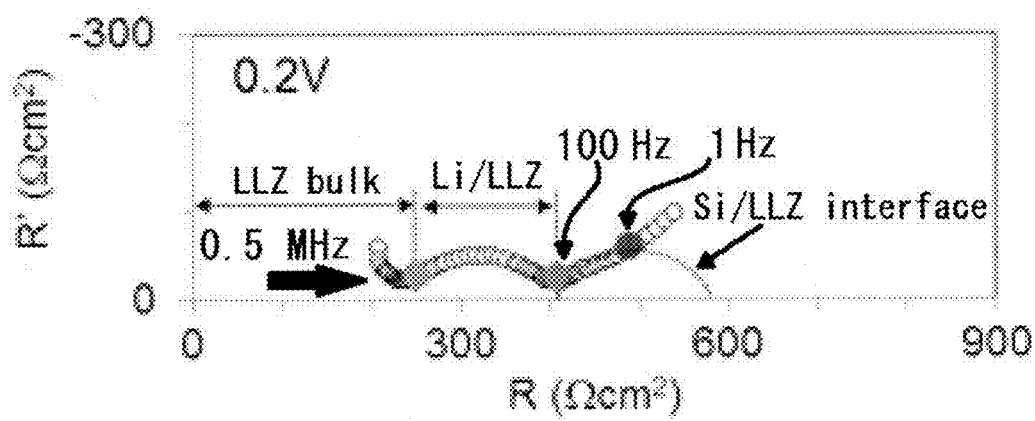
FIG. 4B is a Nyquist diagram showing results of impedance measurement of the oxide all-solid-state battery of Example 1 at 0.2 V (vs. Li$^+$/Li)
Figure 4C:
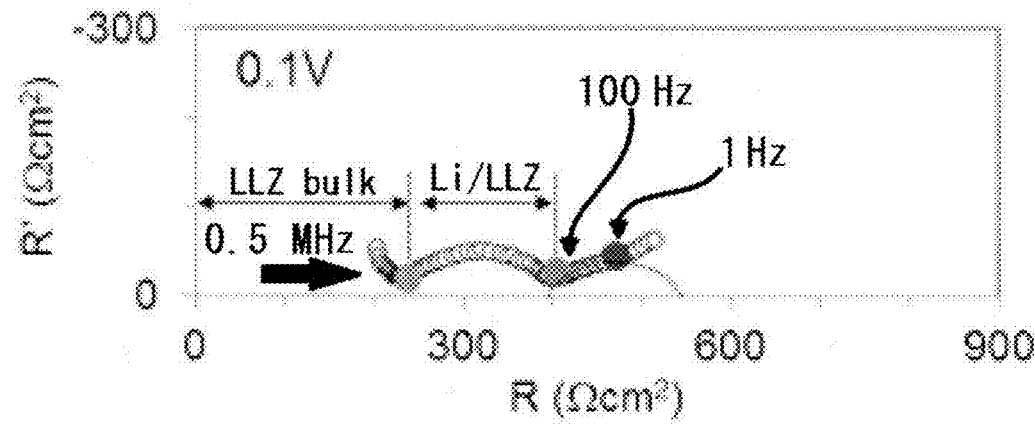
FIG. 4C is a Nyquist diagram showing results of impedance measurement of the oxide all-solid-state battery of Example 1 at 0.1 V (vs. Li$^+$/Li)

FIG. 3 shows charge and discharge curves of the oxide all-solid-state battery of Example 1. In FIG. 3, a curve on the lower side (a curve showing a point of 0.3 V, that of 0.2 V and that of 0.1 V) indicates a charge curve, and a curve on the upper side indicates a discharge curve. FIGS. 4A, 4B and 4C are Nyquist diagrams showing the results of the impedance measurement of the oxide all-solid-state battery of Example 1 at 0.3 V (vs. $Li^+/Li$), 0.2 V (vs. $Li^+/Li$) and 0.1 V (vs. $Li^+/Li$), respectively. A point of 0.3 V, that of 0.2 V and that of 0.1 V in FIG. 3 correspond to FIG. 4A. FIG. 4B and FIG. 4C, respectively.

From FIG. 3, it is clear that the oxide all-solid-state battery of Example 1 illustrates almost the same charge and discharge curves as the charge-discharge result of a common silicon anode-liquid electrolyte battery (for example, see FIG. 5(a) provided in J. P. Maranchi et al., Electrochemical and Solid-State Letters. 6 (9) A198-A201 (2003)). From this fact, the silicon anode obtained by sintering the liquid silicon material is presumed to have the same properties as a commonly-known silicon anode.

Also in FIGS. 4A to 4C, as with FIGS. 8A to 8C, the frequency characteristic of the Si-LLZ interface is in a range of from 1 to 100 Hz. Therefore, from the size of an arc in this range, it is clear that the resistance of the Li-LLZ interface of Example 1 is about 150 $\Omega cm^2$.

As just described, as a result of comparing the results of Example 1 and Reference Example 1, the following is clear: for the oxide all-solid-state battery produced by using the liquid silicon material (Example 1), the interface between the silicon anode and the LLZ has excellent lithium conductivity comparable to the oxide all-solid-state battery produced by using a conventional sputtering method (Reference Example 1).

4. SEM Observation of Section of Oxide All-solid-state Battery

For a section of the oxide all-solid-state battery of Example 1 cut in the laminating direction, the structure was observed by means of a scanning electron microscope (SEM) (manufactured by JEOL Ltd.) at a magnification of 20,000×. On the same section, line analysis (an elemental analysis method) was carried out using energy dispersive X-ray spectroscopy (EDX).

Figure 5:
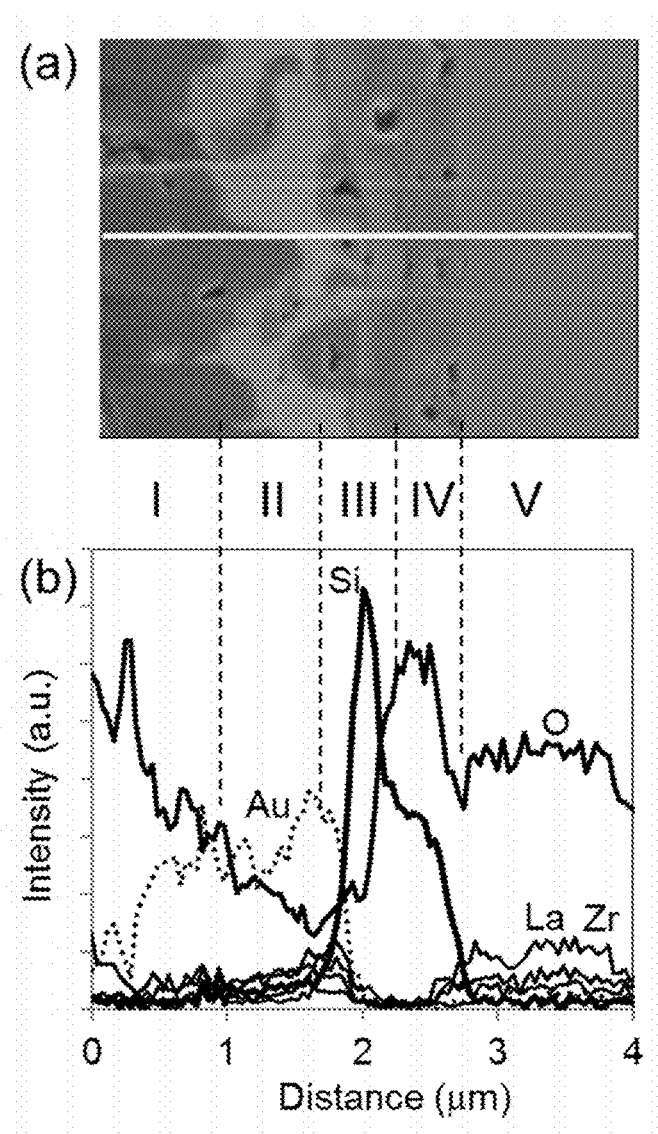
FIG. 5 shows (a) a SEM image of a section of the oxide all-solid-state battery of Example 1 and (b) a graph showing results of EDX line analysis thereof.

FIG. 5 shows (a) a SEM image of a section of the oxide all-solid-state battery of Example 1 and (b) a graph showing EDX line analysis results thereof. In FIG. 5, (b) shows the line analysis results of a white line shown in (a) of FIG. 5, and the horizontal direction of the image (a) corresponds as it is to the horizontal axis of the graph (b). Meanwhile, curves and the words "Au", "Si", "O", "La" and "Zr" shown in (b) indicate the line analysis results by EDX.

From (b), it is clear that the region II where Au is relatively largely detected, is the anode current collector (gold); the region III where Si is relatively largely detected, is the anode active material layer; and the region V where O, La and Zr are largely detected, is the solid electrolyte layer.

Meanwhile, according to (b), the region IV where O and Si are relatively largely detected and La and Zr are slightly detected, remarkably differs in element ratio from the anode active material layer (the region III) and the solid electrolyte layer (the region V); therefore, the formation of the solid electrolyte interface layer different from these layers, can be confirmed. From the result of the impedance measurement, it is clear that the resistance of the Li-LLZ interface is sufficiently low. From the result of the charge-discharge measurement, it is clear that a battery which can be charged and discharged is obtained. From the EDX line analysis, it is clear that atoms lighter than oxygen could not be detected. These results suggest the presence of a lithium element in the region IV.

For the regions III and IV, the thickness was calculated from some points shown in (a) of FIG. 5. As a result, the average thickness of the anode active material layer (the region III) is 0.6 μm, and the average thickness of the solid electrolyte interface layer (the region IV) is 0.2 μm.

The region I shown in (b) corresponds to shavings produced at the time of battery section processing before the SEM observation.

On a section of the oxide all-solid-state battery of Reference Example 1 cut in the laminating direction, SEM observation and line analysis by EDX were carried out in the same manner as above. As a result, regions that correspond to the regions II, III and V in (b) of FIG. 5 were found. However, a region like the region IV in (b), that is, a region where O and Si are relatively largely detected and La and Zr are slightly detected, was not found.

On a section of the oxide all-solid-state battery of Comparative Example 1 cut in the laminating direction, SEM observation and line analysis by EDX were carried out in the same manner as above. As a result, a region like the region III in (b), that is, a region where Si is relatively largely detected, was not found.

From the above, it is clear that by using the liquid silicon material for the formation of the anode active material layer, unlike the case of using the silicon powder (Comparative Example 1) or the case of using the sputtering method (Reference Example 1), the solid electrolyte interface layer can be formed between the anode active material layer and the solid electrolyte layer. Moreover, the joining state of the anode active material layer and the solid electrolyte layer is further enhanced by the solid electrolyte interface layer. It is also clear that due to the presence of the solid electrolyte interface layer, excellent lithium conductivity can be obtained between the anode active material layer and the solid electrolyte layer. In addition, from the excellent lithium conductivity, it is presumed that a lithium element is present in the solid electrolyte interface layer.

REFERENCE SIGNS LIST

1. Cathode active material layer
2. Anode active material layer
3. Solid electrolyte layer
4. Solid electrolyte interface layer
100. Oxide all-solid-state battery

The invention claimed is:

1. An oxide all-solid-state battery comprising a cathode active material layer, an anode active material layer mainly comprising silicon, and a solid electrolyte layer disposed between the cathode active material layer and the anode active material layer,
wherein the solid electrolyte layer is a layer mainly comprising a garnet-type oxide solid electrolyte sintered body represented by the following formula (1):

$$(Li_{x-3y-z}, E_y, H_z)L_\alpha M_\beta O_\gamma \qquad \text{Formula (1)}$$

where E is at least one kind of element selected from the group consisting of Al and Ga; L is at least one kind of element selected from the group consisting of an alkaline-earth metal element and a lanthanoid element; M is at least one kind of element selected from a transition element that can be six-coordinated with oxygen and typical elements in the Groups 12 to 15; x, y and z are real numbers that satisfy $5 \leq x-3y-z \leq 7$, $0 \leq y < 0.22$ and $0 \leq z < 2.0$, respectively; and α, β and γ are real numbers that satisfy $2.5 \leq \alpha \leq 3.5$, $1.5 \leq \beta \leq 2.5$ and $11 \leq \gamma \leq 13$, respectively;
wherein a solid electrolyte interface layer is disposed between the anode active material layer and the solid electrolyte layer;
wherein the solid electrolyte interface layer comprises at least a Si element and an O element; and
wherein a laminate comprising at least the anode active material layer, the solid electrolyte interface layer and the solid electrolyte layer has peaks at positions where 2θ=32.3°±0.5°, 37.6°±0.5°, 43.8°±0.5°, and 57.7°±0.5° in a XRD spectrum obtained by XRD measurement using CuKα irradiation.

2. The oxide all-solid-state battery according to claim 1, wherein the solid electrolyte interface layer comprises a Si element, an O element and a Li element.

3. The oxide all-solid-state battery according to claim 1, wherein the peaks at the positions where 2θ=32.3°±0.5°, 37.6°±0.5°, 43.8°±0.5°, and 57.7°±0.5° in the XRD spectrum, are assigned to the solid electrolyte interface layer.

4. The oxide all-solid-state battery according to claim 1, wherein an average thickness of the solid electrolyte interface layer is 1 nm or more and 800 nm or less.

5. The oxide all-solid-state battery according to claim 1, wherein the anode active material layer is an amorphous layer mainly comprising silicon.

* * * * *